United States Patent Office 2,714,942
Patented Aug. 9, 1955

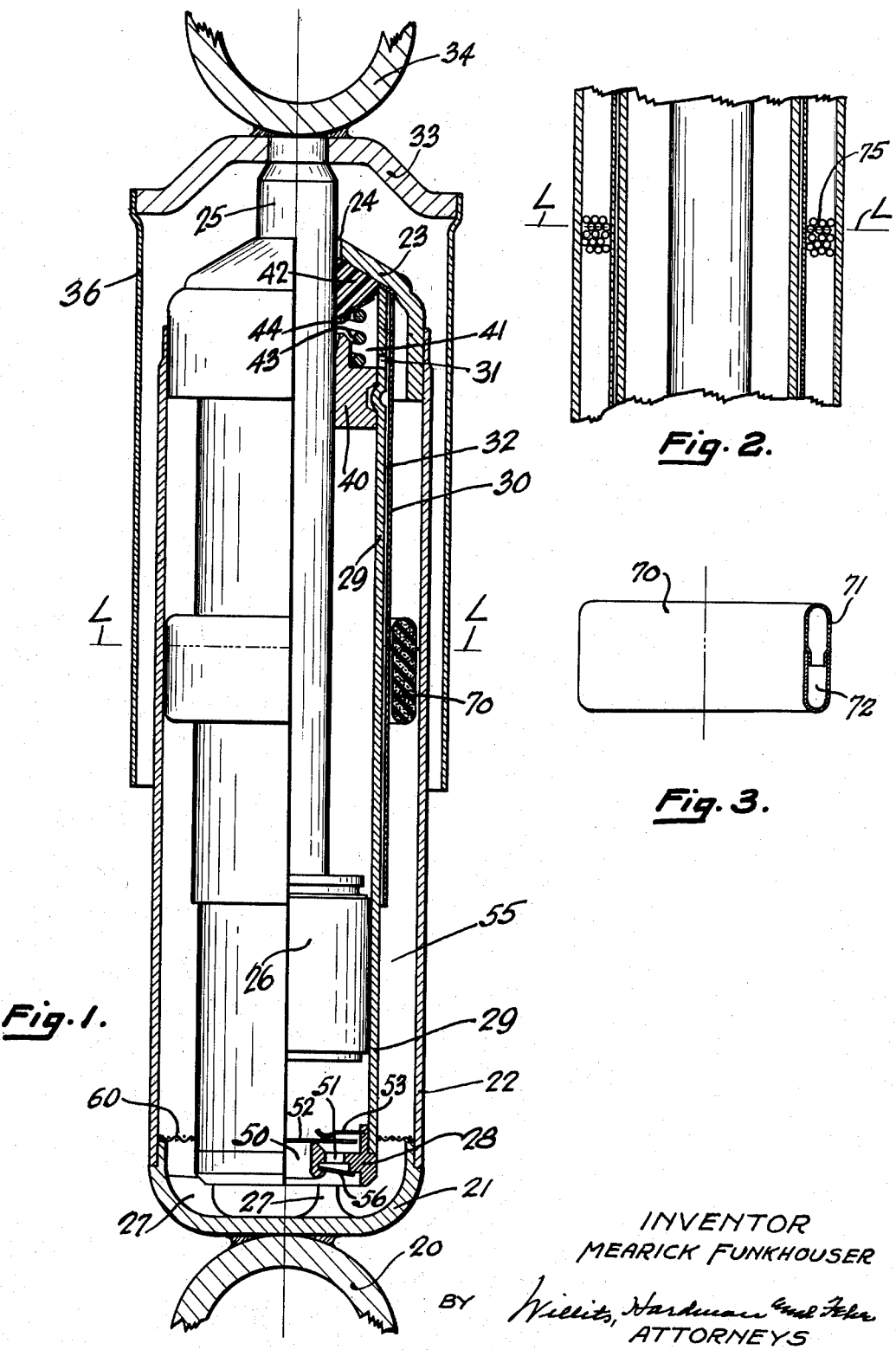

2,714,942

SHOCK ABSORBER WITH FLOATING BAFFLE

Mearick Funkhouser, Dayton, Ohio, assignor to General Motors Corporation, Detroit, Mich., a corporation of Delaware Application March 1, 1950, Serial No. 147,073

4 Claims. (Cl. 188—100)

This invention relates to improvements in hydraulic shock absorbers.

It is among the objects of the present invention to provide an hydraulic shock absorber in which the turbulence of the fluid during normal operation of the shock absorber is substantially reduced thereby practically eliminating the mixing of air with the fluid.

A further object of the present invention is to provide an hydraulic shock absorber with a fluid turbulence eliminating device operative to move with the shifting level of the fluid inside the shock absorber.

Further objects and advantages of the present invention will be apparent from the following description, reference being had to the accompanying drawing wherein a preferred embodiment of the present invention is clearly shown.

In the drawing:

Fig. 1 is a longitudinal, part sectional view of a direct acting type hydraulic shock absorber equipped with the present invention.

Fig. 2 is a fragmentary sectional view of a portion of the shock absorber, a modified form of construction of the present invention being shown applied thereto.

Fig. 3 is a view showing one form of the construction of the present invention.

The present drawing illustrates the hydraulic shock absorber as being of the direct acting type. This type of shock absorber consists of two relatively movable assemblies one of which is anchored to the axle of the vehicle, the other to the frame of the vehicle, the shock absorber being operative to control relative movements between said axle and said frame of the vehicle. The numeral 20 designates a mounting ring adapted to be secured to the axle of the vehicle in any suitable manner. This ring 20 has an end cover cup 21 anchored thereto in any suitable manner, by welding as shown in the present drawings, this cup forming an end closure member for the tube 22. At the opposite end of the tube 22 another end closure member or cup 23 is secured thereto, this cup 23 having a central opening 24 through which the rod 25 of the piston 26 extends. A plurality of spaced lugs 27 are provided within the cup 21 these lugs forming supporting feet for the valve cage 28 which is secured in the lower end of the cylinder 29. The upper or opposite end of the cylinder 29 is engaged by the upper cup 23. In the present construction the provision of a tube 30, surrounding the cylinder 29 and having an inwardly extending flange clamped between the end of the cylinder 29 and the upper cup 23, forms a narrow, annular space 32 between it and said cylinder 29. This space is in communication with the interior of the cylinder through ports 31 formed in the cylinder wall.

The piston 26, reciprocative within the cylinder 29 forms two working chambers therein. This piston is provided with any suitable, well known fluid flow control mechanism, not shown, which controls the passage of fluid through the piston in either direction as the said piston is reciprocated within the cylinder. As has been mentioned before piston 26 has its rod 25 extending through the central opening 24 of the cylinder cap 23 to the outside of the shock absorber, the outer end of the piston rod 25 having a disc 33 anchored thereto and the disc having a ring 34 attached thereto in any suitable manner. Ring 34 provides means for securing this movable portion of the shock absorber to the frame of the vehicle. An outer tubular member 36, secured to the disc 33, surrounds the assembly and provides a dust and stone guard.

A piston rod guide 40 is immovably secured within the cylinder 29 and slidably supports the piston rod 25. This rod guide forms the upper closure member for the cylinder and is so located within the cylinder so as to form an upper chamber 41 in which a packing 42 of any suitable material is housed, said packing sealingly engaging the piston rod 25, the end cover cap 23 and a portion of the inner wall of the cylinder 29. Packing 42 is constantly urged into sealing engagement with said portions of the shock absorber by a spring 43 interposed between a pressure plate 44 on said packing and the rod guide 40.

The valve cage 28 secured with the lower end of the cylinder 29 has a central opening 50. A plurality of smaller openings 51 are arranged in a circular row about said central opening 50. A disc valve 52 is urged upon the inner surface of the valve cage 28 by spring fingers 53 secured in said valve cage. Valve 52 normally shuts off communication between the inside of the cylinder and the chamber in the end closure cap 21 beneath said valve cage 28. The interior of the end cover cap 21 communicates with the reservoir space 55 which is formed by the outer tube 22 about the cylinder 29. A spring disc-valve 56 in the form of a ring, has its inner peripheral surface secured to the valve cage in such a manner that said disc valve is biased yieldably to urge its outer peripheral edge into engagement with a shoulder in the valve cage 28 whereby said disc valve 56 shuts off communication between the inside of the cylinder and the reservoir via passages 51 until a predetermined fluid pressure within the cylinder, due to the movement of the shock absorber piston downwardly, flexes said valve 56 to move its outer peripheral edge portion out of engagement with the valve cage and establish a restricted flow of fluid from the cylinder, through passages 51 into the reservoir.

During the operation of the shock absorber and particularly as the piston 26 moves upwardly in the cylinder fluid may leak through the rod guide 40 along the piston rod 25 into the packing containing chamber 41. In order to provide means for returning this fluid to the reservoir, openings 31 are provided in the wall of the cylinder 29 through which the fluid, accumulating in chamber 41, may enter the annular passage 32 and again pass into the reservoir beneath the level of the fluid therein, said level being indicated by the line L. Within the reservoir and near the bottom thereof a screen 60 is provided which will prevent any movable elements within the reservoir 55 of the shock absorber from dropping down into the end cover cap 21.

The present invention has for its feature the provision of a body or mass within the reservoir which is buoyantly supported by the fluid therein and movable in accordance with the changing level of the fluid, said mass or body acting to quell the turbulence of the fluid within the reservoir and thus prevent its mixing with the air in said reservoir during the normal operation of the shock absorber.

A shock absorber interposed between the frame and axle of a vehicle will, when the vehicle is being operated over a roadway and particularly a rough roadway, be shaken violently causing the fluid within the shock absorber reservoir to be agitated and eventually aerated due to the mixing of the air and fluid within the reservoir. If the fluid within the reservoir becomes aerated to a substantial degree the efficiency of the shock absorber will be greatly reduced for the presence of air charged fluid within the cylinder will prevent the shock absorber from offering the proper amount of resistance to relative movements between the frame and axle of the vehicle. It is essential for full shock absorber efficiency to draw solid and incompressible fluid within the shock absorber cylinder and therefore elimination of air in the fluid of the shock absorber will maintain its efficiency.

In the Fig. 1 of the drawing the body buoyantly supported by the fluid within the reservoir 55 is shown in the form of a ring 70, the outer wall of said ring being spaced predeterminately from the inner wall of the reservoir tube 22 and the inner peripheral wall of said floating body being spaced predeterminately from the outer wall of the tube 30, in case such a tube is provided, and from the outer wall of the cylinder itself, in case the shock absorber is not provided with the tubular member 30 but has some other means for directing the fluid in chamber 41 to the reservoir, such means being well known in the art. The ring shaped member designated by the numeral 70 buoyantly supported by the fluid within the shock absorber reservoir 55 may be made of any suitable material upon which the fluid within the reservoir will have no deteriorating effect and having a specific gravity causing said body 70 to float on the surface of the fluid within the reservoir. Materials such as synthetic rubber, plastics or the like, not affected by the fluid may be used, and a ring shaped member 70 as shown in the Fig. 3 may be used, this ring shaped member being made of two interfitting metallic portions 71 and 72 welded or soldered together to form an inside air space which would cause the element to float properly on the fluid within the reservoir.

Instead of a body as shown in Figs. 1 and 3 this buoyantly supported means may be a plurality of pellets or bubble-like particles 75 as shown in Fig. 2, these pellets or particles being made of any suitable material such as polystyrene, polyethylene, glass or any other material upon which the fluid will have no deteriorating effect and having a specific gravity which will cause said pellets to float in a predetermined fashion upon the surface of the fluid within the reservoir 55.

In either form the buoyant body or mass moves within the reservoir in accordance with the changing level of the fluid therein. When the fluid level within the reservoir drops, due to the taking in of the fluid from the reservoir into the cylinder, the buoyant body or mass will move downwardly and when the fluid level raises due to the ejection of fluid from the cylinder by the piston into the reservoir then the body or mass will rise within the reservoir, the relative position of the body 70 or mass 75 to the level of the liquid within the reservoir remaining substantially constant under all conditions. If, during shock absorber operation, the shock absorber is violently shaken in a manner of a cocktail shaker, the floating body or mass will act as a damping element preventing agitation of the fluid within the reservoir and consequently substantially eliminating the mixing of air with the fluid in said reservoir. The provision of the screen 60 at the bottom of the reservoir will prevent the pellets 75 from dropping down into the end cover member 21 at the time of assembly, thus preventing the pellets from becoming lodged beneath the valve cage and possibly affecting the operation of the valve mechanism within the cage after assembly.

From the foregoing it may be seen that the present invention provides a simple and inexpensive means within the shock absorber reservoir for quelling the turbulence of the fluid in said reservoir during operation of the shock absorber and thereby substantially eliminating aeration of the fluid therein thus providing a shock absorber capable of operating at full efficiency.

While the embodiment of the present invention as herein disclosed, constitutes a preferred form, it is to be understood that other forms might be adapted.

What is claimed is as follows:

1. An hydraulic shock absorber consisting of a cylinder having a reciprocative piston therein, a fluid containing reservoir in communication with said cylinder through fluid flow controlling means attached to the cylinder, said means providing for the controlled transfer of fluid between the cylinder and reservoir in response to reciprocation of the piston, said transfer of fluid varying the fluid level within the reservoir, and a buoyant mass floating upon the fluid within the reservoir moving in accordance with the rise and fall of the fluid therein and effecting restriction to the movement of fluid within the reservoir between opposite sides of the mass whereby to damp agitation of the fluid in the reservoir.

2. An hydraulic shock absorber consisting of a cylinder having a reciprocative piston therein, a fluid containing reservoir in communication with said cylinder through fluid flow controlling means attached to the cylinder, said means providing for the controlled transfer of fluid between the cylinder and reservoir in response to reciprocation of the piston, which, in one direction, raises the level of the fluid within the reservoir and in the other direction lowers said fluid level, and a float in said reservoir having its wall surfaces predeterminately spaced from the walls of the reservoir to provide thereby a damping element to prevent agitation of the fluid in the reservoir, said float being buoyantly supported by the fluid in the reservoir and being moved in the reservoir by the lowering and rising fluid level therein.

3. An hydraulic shock absorber consisting of a cylinder having a reciprocative piston therein, a fluid containing reservoir surrounding said cylinder and in communication therewith through fluid flow control devices operative to control the transfer of fluid between said cylinder and reservoir in response to piston reciprocation, said transfer of fluid causing the fluid level in the reservoir to rise and fall, and a ring-shaped member in the reservoir having surfaces predeterminately spaced from the cylinder and reservoir walls respectively to provide thereby a damping element to prevent agitation of the fluid in the reservoir, said member being buoyantly supported by the fluid in the reservoir and moving in accordance with the rise and fall of the fluid level therein.

4. A shock absorber in accordance with claim 1 in which the buoyant mass floating upon the fluid within the reservoir consists of a plurality of pellets made of a buoyant material upon which the fluid has no deteriorating effects, said mass of pellets moving with the change of fluid level within the reservoir and providing tortuous, restricting passages through the mass.

References Cited in the file of this patent

UNITED STATES PATENTS

| | | |
|---|---|---|
| 280,820 | Hickson | July 10, 1883 |
| 359,985 | Swander | Mar. 22, 1887 |
| 1,404,924 | Bloss | Jan. 31, 1922 |
| 1,775,349 | Kaun | Sept. 9, 1930 |
| 2,138,513 | Rossman et al. | Nov. 29, 1938 |
| 2,329,803 | Whisler, Jr. | Sept. 21, 1943 |
| 2,330,366 | Jayne | Sept. 28, 1943 |

FOREIGN PATENTS

| | | |
|---|---|---|
| 632,496 | Great Britain | Nov. 28, 1949 |